Patented May 12, 1953

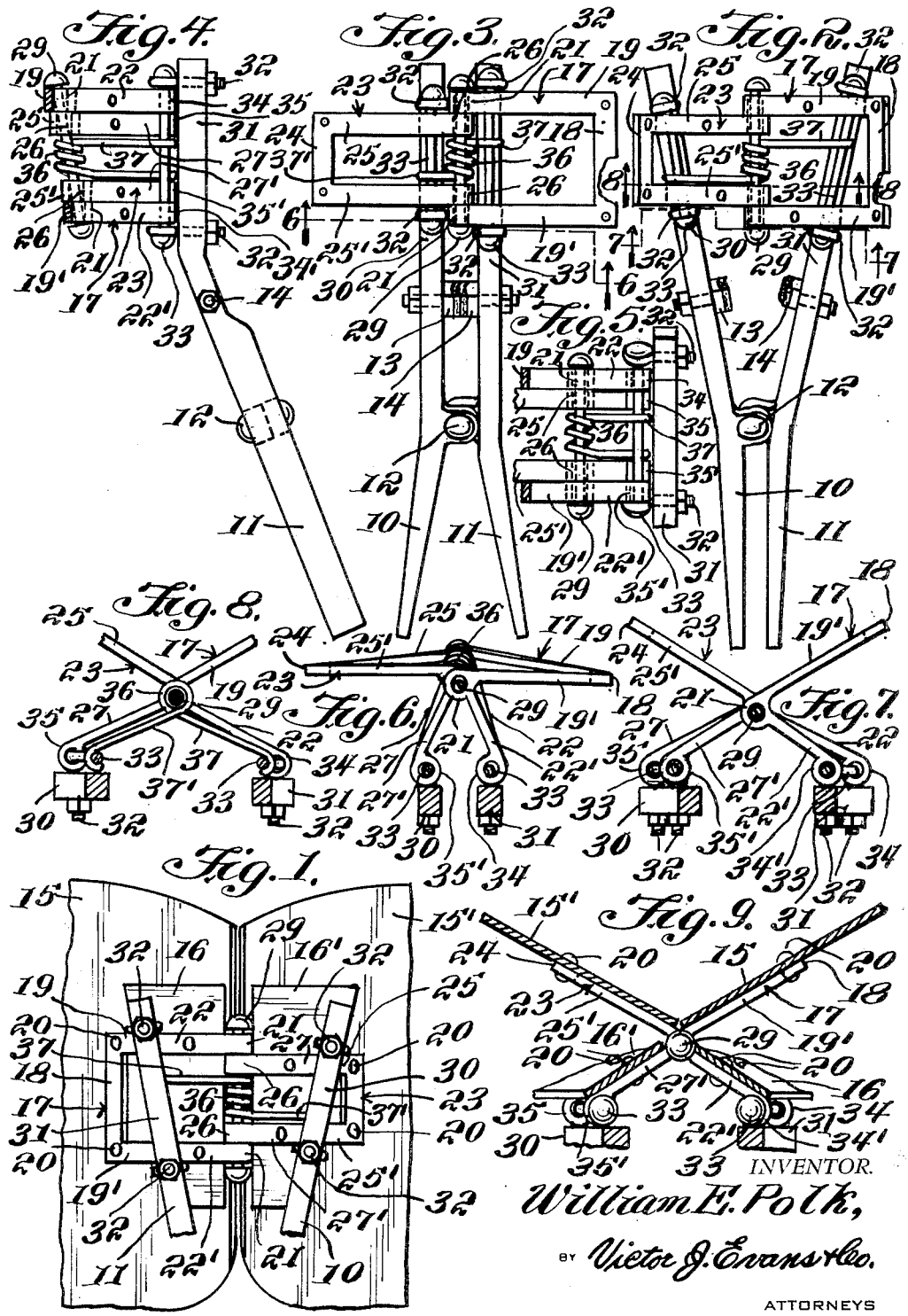

2,637,938

UNITED STATES PATENT OFFICE 2,637,938

FLAPPING WING TOY

William Eugene Polk, Shreveport, La.

Application June 15, 1949, Serial No. 99,172

1 Claim. (Cl. 46—124)

The present invention relates to improvements in a mechanical toy device of the type having wing sections that may be given an oscillatory motion by applying pressure to a pair of handles to which the wing sections are pivotally attached.

An object of this invention is to provide a mechanical toy device which is designed to resemble birds, bats, butterflies or other flying insects and is similar to the mechanical toy shown in my copending application Serial No. 98,229.

A further object of the invention is to provide a mechanical toy device wherein compression of a pair of pivoted handles will cause the wing sections attached to the handles to move upwardly and to provide a spring means to cause the wing sections to move downwardly when the handles are released, thus providing a motion similar to the wing movements of a flying bird or insect.

With the above and other objects and advantages in view the invention consists of the novel combination and arrangement of parts hereinafter more fully described, claimed and shown in the attached drawings in which:

Fig. 1 is a bottom plan view of the invention with the wings in up position and with parts broken away;

Fig. 2 is a top plan view with the wings removed and the remaining parts in position as shown in Fig. 1;

Fig. 3 is a view similar to Fig. 2 with the parts in normal or down position;

Fig. 4 is a side elevation of the parts as shown in Fig. 3;

Fig. 5 is a side elevation of the parts as in Fig. 2 with some of the parts broken away;

Fig. 6 is a sectional view on the line 6—6 of Fig. 3;

Fig. 7 is a sectional view on the line 7—7 of Fig. 2;

Fig. 8 is a sectional view on the line 8—8 of Fig. 2; and

Fig. 9 is a view with the parts shown as in Fig. 1 with some parts in section and other parts in elevation.

Referring more in detail to the drawings wherein a preferred embodiment of the invention is shown to include a pair of similarly formed handles 10 and 11 which are pivotally connected together intermediate of their ends by the pivot pin 12. To limit the inward movement of the outer end of the handles 10 and 11, the handle 10 is provided with a stop means 13 while the handle 11 is provided with a stop means 14. As shown in Fig. 2, the stop 13 is provided with a concave face while the stop 14 is provided with a convex face, and the engagement of these two faces limits the closing movement of the handles 10 and 11 upon releasing thereof by the operator of the handles. Rubber pads may be attached to the faces of the stops 13 and 14 to act as shock absorbers when the handles are moving to closed position. The stops also tend to hold the handles more rigidly when the handles are in closed position.

The bird or simulating wings comprise a pair of large sections 15 and 15' respectively, which are similar in shape and contour to each other and a pair of small sections 16 and 16' respectively, which are also similar to each other in shape and contour, but are of smaller area than the sections 15 and 15'.

U-shaped reinforcing element 17 having a base 18 and a pair of stems 19 and 19' respectively, extending outwardly of the base 18, are attached to the wing section 15 by any well-known fastening means 20. Each stem at its outer end is provided with a bearing support 21 and short extensions 22 and 22' respectively, extend from the bearing supports 21 at an acute angle to the stems 19 and 19' respectively. A similar U-shaped reinforcing element 23 having a base 24 and a pair of stems 25 and 25' respectively, extending outwardly of the base 24 are also attached to the wing section 15' by any well-known fastening means 20. Each stem at its outer end is provided with a bearing support 26 and it will be seen in Fig. 1 that the bearing supports 26 are positioned intermediate of the bearing supports 21 of the reinforcing element 17. Short extensions 27 and 27' respectively, extend from the bearing supports 26 at an acute angle to the stems 25 and 25' respectively. The reinforcing elements 17 and 23 are therefore similar in shape except that the element 23 is of a size to permit the stems 25 and 25' respectively, thereof to be positioned intermediate of the stems 19 and 19' of the element 17.

A through bolt 29 is passed through the bearing supports 21 and 26 to loosely pivotally or hingedly connect the reinforcing elements 17 and 23 for oscillating motion in relation to each other, as shown in Fig. 1.

The outer ends 30 and 31 respectively, of the handles 10 and 11 are positioned at an angle to the remainder of the handle, as shown in Fig. 4. Secured to the portions 30 and 31 respectively, in spaced relation to each other are the eye bolts 32 and the eye bolts 32 on each handle loosely receive a through bolt 33. The outer ends of the short extensions 22 and 22' of the element 17 are provided with bearing supports 34 and 34' respectively, which are loosely journalled on the through bolt 33 on the handle 11. The outer ends of the short extensions 27 and 27' of the element 23 are provided with bearing supports 35 and 35' respectively, which are loosely journalled on the through bolt 33 on the handle 10. A coil spring 36 is coiled on the through bolt 29 and one end 37 thereof extends in one direction to engage the through bolt 33 on the handle 11 while the other end thereof extends in the opposite direction to engage the through bolts 33 on the handle 10.

With the spring 36 mounted on the through bolt 29 the spring may be hidden from view by a flexible cover joining the wing sections or by any other suitable means. Thus by using a coiled spring on the through bolt 29 a spring will not have to be mounted on the handles. The coiled spring, by having the ends thereof overlap or engage the through bolts 33, provides a positive closing force that is directly applied to both wing sections and also directly to the handles.

In the operation of the device, pressure is applied to the lower ends of the handles by a hand of the operator. The pressure on the ends of the handles will cause the upper ends to spread wide. This action will cause the wing sections 15 and 15' to move upwardly and place a tension on the ends of the coil spring. When pressure is released on the ends of the handles the tension of the coil spring 36 will quickly move the wing sections 15 and 15' downwardly into normal position and the upper ends of handles into closed position as permitted by the stops 13 and 14.

Repeated pressure on the handles and the release thereof will cause the wing sections to move up and down simulating the flight of a bird or insect.

Having thus described the invention what is claimed as new and desired to be secured by Letters Patent is:

In a toy, a pair of handles, a swivel pin pivotally connecting said handles together intermediate of their ends, one end of said handles adapted to be gripped in the user's hand for causing pivotal movement of the handles, a pair of U-shaped reinforcing members including a pair of stems extending outwardly of a base member and having bearing supports on the outer ends of the stem members, short extensions on each stem extending at an acute angle thereto and having bearing supports on the outer ends thereof, a first section of a bird or insect simulating wing member secured to each of said reinforcing members, a second section of a similar wing member secured to said extensions, a first through bolt pivotally connecting the bearing supports on the stems of the reinforcing members, a second through bolt passing through the bearing supports on each extension for pivotally connecting each extension to the other end of said handles, spring means connected to said first and second through bolts, so that upon compression of the one end of said handles said wings will move up and upon release of the one end of said handles said spring means will cause said wings to move down into normal position, and said spring means embodying a coil spring circumposed on said first said through bolt.

WILLIAM EUGENE POLK.

References Cited in the file of this patent
UNITED STATES PATENTS

| Number | Name | Date |
|---|---|---|
| 227,933 | Erichsen | May 25, 1880 |
| 724,829 | Eberth | Apr. 7, 1903 |
| 833,485 | Rud | Oct. 16, 1906 |
| 837,217 | Gilbert | Nov. 27, 1906 |
| 962,414 | Bernard | June 28, 1910 |
| 1,239,040 | Radkoff | Sept. 4, 1917 |
| 1,353,147 | Converse | Sept. 21, 1920 |
| 1,484,100 | Wertz | Feb. 19, 1924 |
| 1,510,507 | Smolens | Oct. 7, 1924 |
| 1,538,562 | Koshalko | May 19, 1925 |
| 2,109,147 | Grosso | Feb. 22, 1938 |

FOREIGN PATENTS

| Number | Country | Date |
|---|---|---|
| 103,335 | Austria | May 10, 1926 |